(12) United States Patent
Wang et al.

(10) Patent No.: US 7,554,609 B2
(45) Date of Patent: Jun. 30, 2009

(54) METHOD AND APPARATUS FOR DETECTING AND REJECTING NTSC INTERFERENCE IN ATSC SYSTEM

(75) Inventors: Wei-Ting Wang, Taipei (TW); Cheng-Yi Huang, I-Lan Hsien (TW); Bao-Chi Peng, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 497 days.

(21) Appl. No.: 10/905,933

(22) Filed: Jan. 27, 2005

(65) Prior Publication Data

US 2006/0164554 A1 Jul. 27, 2006

(51) Int. Cl.
  H04N 5/00 (2006.01)
  H04N 5/28 (2006.01)
  H04N 7/04 (2006.01)
  H04N 9/64 (2006.01)
  H04N 5/50 (2006.01)
  H04N 5/14 (2006.01)
  H04N 5/44 (2006.01)

(52) U.S. Cl. .......... 348/607; 348/21; 348/470; 348/604; 348/720; 348/725; 348/731; 375/346

(58) Field of Classification Search .......... 348/604, 348/607, 21, 470, 720, 725, 726, 731; 375/346
See application file for complete search history.

(56) References Cited

U.S. PATENT DOCUMENTS

| | | | | |
|---|---|---|---|---|
| 5,282,023 A * | 1/1994 | Scarpa | ........... | 348/624 |
| 5,325,188 A * | 6/1994 | Scarpa | ........... | 348/624 |
| 5,325,204 A * | 6/1994 | Scarpa | ........... | 348/607 |
| 5,400,084 A * | 3/1995 | Scarpa | ........... | 348/624 |
| 5,546,132 A * | 8/1996 | Kim et al. | ........... | 348/607 |
| 5,550,596 A * | 8/1996 | Strolle et al. | ........... | 348/607 |
| 5,821,988 A * | 10/1998 | Citta et al. | ........... | 348/21 |
| 6,344,871 B1 | 2/2002 | Liu et al. | | |
| 6,456,315 B1 * | 9/2002 | Shinada | ........... | 347/256 |
| 6,633,325 B1 * | 10/2003 | Lee | ........... | 348/21 |
| 7,030,901 B2 * | 4/2006 | Ahn | ........... | 348/21 |
| 7,218,357 B2 * | 5/2007 | Kim et al. | ........... | 348/607 |
| 7,218,359 B2 * | 5/2007 | Peng et al. | ........... | 348/731 |
| 7,239,358 B1 * | 7/2007 | Mayer | ........... | 348/731 |
| 2002/0036714 A1 * | 3/2002 | Markman | ........... | 348/607 |
| 2004/0196361 A1 * | 10/2004 | Liu et al. | ........... | 348/21 |
| 2004/0257471 A1 * | 12/2004 | Kim | ........... | 348/554 |
| 2005/0012865 A1 * | 1/2005 | Kim et al. | ........... | 348/614 |
| 2005/0254598 A1 * | 11/2005 | Zhidkov et al. | ........... | 375/316 |
| 2006/0007299 A1 * | 1/2006 | Wang et al. | ........... | 348/21 |
| 2006/0146200 A1 * | 7/2006 | Edde et al. | ........... | 348/725 |
| 2006/0256190 A1 * | 11/2006 | Liou et al. | ........... | 348/21 |
| 2007/0064156 A1 * | 3/2007 | Liou et al. | ........... | 348/614 |

OTHER PUBLICATIONS

Carl Scarpa, "A Recursive NTSC Canceler to Reduce Co-Channel Interference into HDTV Broadcasts", IEEE-Transactions on Consumer Electronics, vol. 39, No. 3, Aug. 1993, pp. 696-703.

* cited by examiner

*Primary Examiner*—Brian P Yenke
(74) *Attorney, Agent, or Firm*—Thomas, Kayden, Horstemeyer & Risley

(57) ABSTRACT

A method and apparatus for rejecting an interference signal from an input frequency spectrum. The method includes the steps of receiving the input signal; frequency-shifting the received input signal by a first frequency-shifting amount; and filtering the frequency-shifted input signal to filter out the interference component from the input signal.

30 Claims, 4 Drawing Sheets

METHOD AND APPARATUS FOR DETECTING AND REJECTING NTSC INTERFERENCE IN ATSC SYSTEM

BACKGROUND OF INVENTION

1. Field of the Invention

The invention relates to digital television systems, and more particularly, to a method and apparatus for detecting and rejecting NTSC interference from an ATSC signal.

2. Description of the Prior Art

Please refer to FIG. 1, which is a diagram of a typical transmission frequency band conforming to the Advanced Television Systems Committee (ATSC) DTV standard and the National Television System Committee (NTSC) analog TV standard. It is well known that the NTSC analog TV utilizes three sub-carriers to transfer information. As shown in FIG. 1, these NTSC sub-carriers are utilized for transferring NTSC video information, NTSC color information, and NTSC audio information, respectively. Please note that the frequency intervals among the three sub-carriers are fixed. As shown in FIG. 1, the frequency interval between the NTSC video sub-carrier and the NTSC color sub-carrier is 3.58 MHz, and the frequency interval between the NTSC color sub-carrier and the NTSC audio sub-carrier is 0.92 MHz. Furthermore, it can be seen in FIG. 1 that the three NTSC sub-carriers overlap the transmission band defined for the ATSC signal. When an ATSC TV receives the ATSC signal, the information carried by the three NTSC sub-carriers can be regarded as the co-channel interferences of the ATSC signal. Therefore, the information carried by the three NTSC sub-carriers should be precisely removed before the ATSC TV demodulates the received ATSC signal; otherwise, the final display quality of the ATSC TV might be degraded due to such undesired interferences.

A first method in the conventional art to reject NTSC co-channel interference from the ATSC signal is to utilize a plurality of notch filters to filter out the interference components within a frequency band. If the NTSC interference sub-carrier can be placed at the null of the notch filter, the NTSC interference can be appropriately removed. However, when, as in most cases, the NTSC signal and the ATSC signal come from different transmitter sources, and thus have carrier offsets between transferred signals, it becomes practically difficult to align the nulls of the notch filters with the interference sub-carriers. The consequence is that the NTSC interferences cannot be precisely placed at the nulls, and the notch filters may filter out wrong frequency components instead of the unwanted NTSC interferences.

A second method is to utilize a comb filter to filter out the interference components within an incoming signal. The comb filter has a plurality of nulls, but usually wider in frequency. This means that even when the NTSC signal and the ATSC signal have slight carrier offsets, the comb filter can still filter out the deviated interference components. An alternative problem occurs, however. Due to the comb filter having a wider null, the comb filter simultaneously filters out the interference components and some signal components belonging to the wanted ATSC signal, whereby increases the difficulty of performing back-end decoding operation on the unduly filtered ATSC signal.

SUMMARY OF INVENTION

It is therefore one of the many objectives of the claimed invention to provide a method and apparatus for detecting and rejecting NTSC co-channel interference from an ATSC signal.

According to the embodiments of the invention, a method for rejecting an interference component from a frequency spectrum of an input signal is disclosed. The method comprises receiving the input signal; locking the interference component in the received input signal; detecting the locking status of the locking step; and filtering out the interference component from the input signal.

According to the embodiments of the invention, a method for rejecting an interference component from a frequency spectrum of an input signal is also disclosed. The method comprises receiving the input signal; frequency-shifting the received input signal by a first frequency-shifting amount; and filtering the frequency-shifted input signal to filter out the interference component from the input signal.

According to the embodiments of the invention, an apparatus for rejecting an interference component from a frequency spectrum of an input signal is also disclosed. The apparatus comprises an interference locking unit for receiving the input signal and locking the interference component in the received input signal; a lock detector coupled to the interference locking unit, for detecting the locking status of the interference locking unit; and a filter for receiving the input signal and filtering out the interference component from the input signal.

According to the embodiments of the invention, an apparatus for rejecting an interference component from a frequency spectrum of an input signal is further disclosed. The apparatus comprises an interference acquisition unit for receiving the input signal and generating a first frequency-shifting amount according to the location of the interference component in the frequency spectrum of the input signal; a first frequency shifter for receiving the input signal and frequency-shifting the input signal according to the first frequency-shifting amount; and a filter coupled to the first frequency shifter, for filtering out the interference component from the frequency-shifted input signal.

These and other objectives of the present invention will no doubt become obvious to those of ordinary skill in the art after reading the following detailed description of the preferred embodiment that is illustrated in the various figures and drawings.

DETAILED DESCRIPTION

Please note that, in the following illustration, rejecting the NTSC co-channel interference (hereinafter "NTSC interference" for simplicity) from the ATSC signal is disclosed. Although herein the NTSC co-channel interference and the ATSC signal are taken as examples, the application of the present invention is not limited thereto. The present invention method and apparatus is capable of rejecting unwanted interferences from a received signal.

Figure 2:
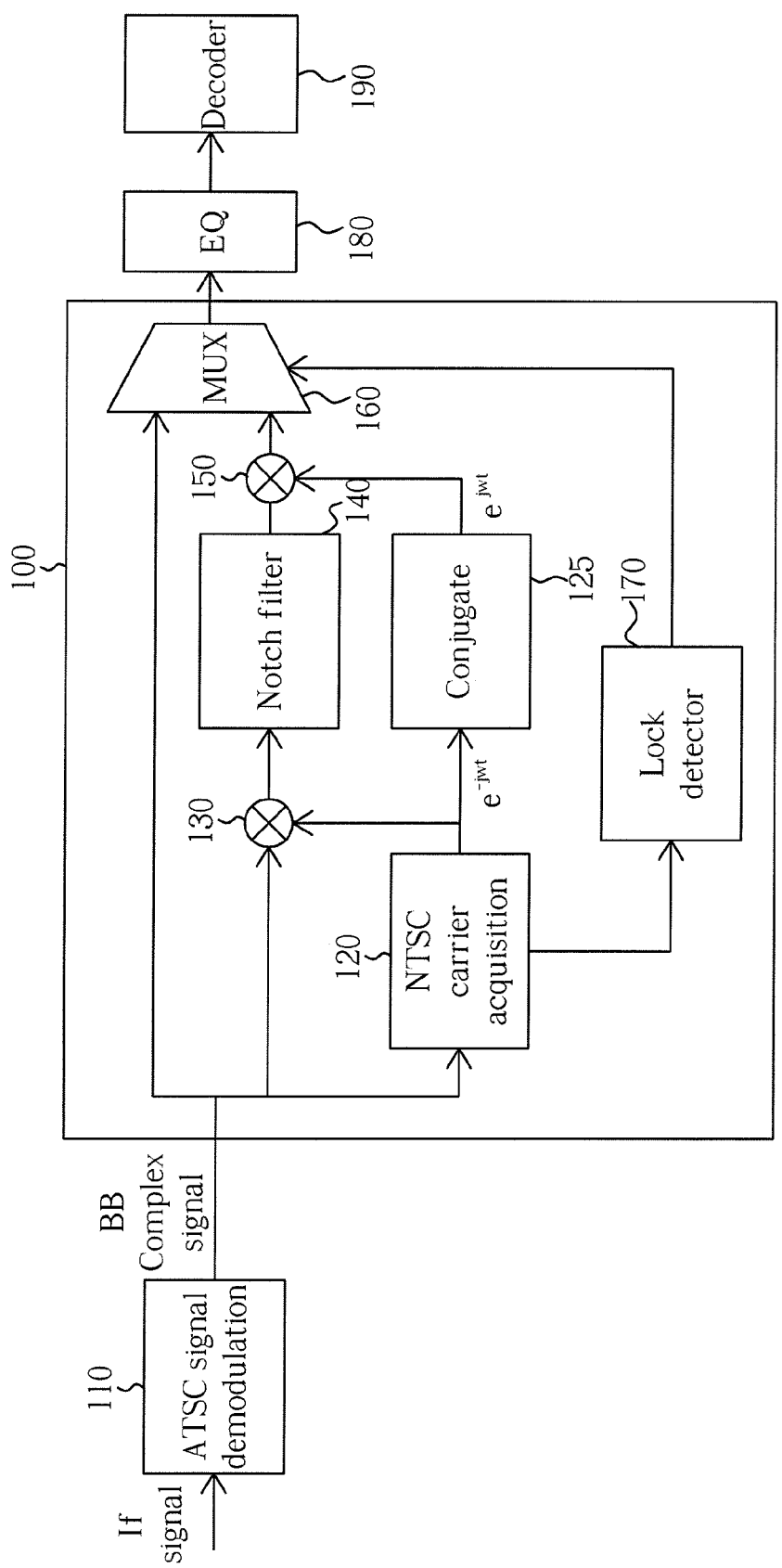
FIG. 2 is a block diagram of an apparatus for rejecting the NTSC interference from an ATSC signal according to an embodiment of the present invention.

Please refer to FIG. 2, which is a block diagram of an apparatus 100 for rejecting the NTSC interference from an ATSC signal deposed within a TV controller, according to an embodiment of the invention. In this embodiment, as would be apparent to those of ordinary skill in the art, the apparatus 100 typically receives baseband complex signal from an ATSC signal demodulation unit 110, which demodulates received IF signal, and outputs to subsequent circuitries such as equalizer 180 and decoder 190, etc. However, one should appreciate that the application of the present invention is not limited to the structure herein illustrated.

Figure 1:
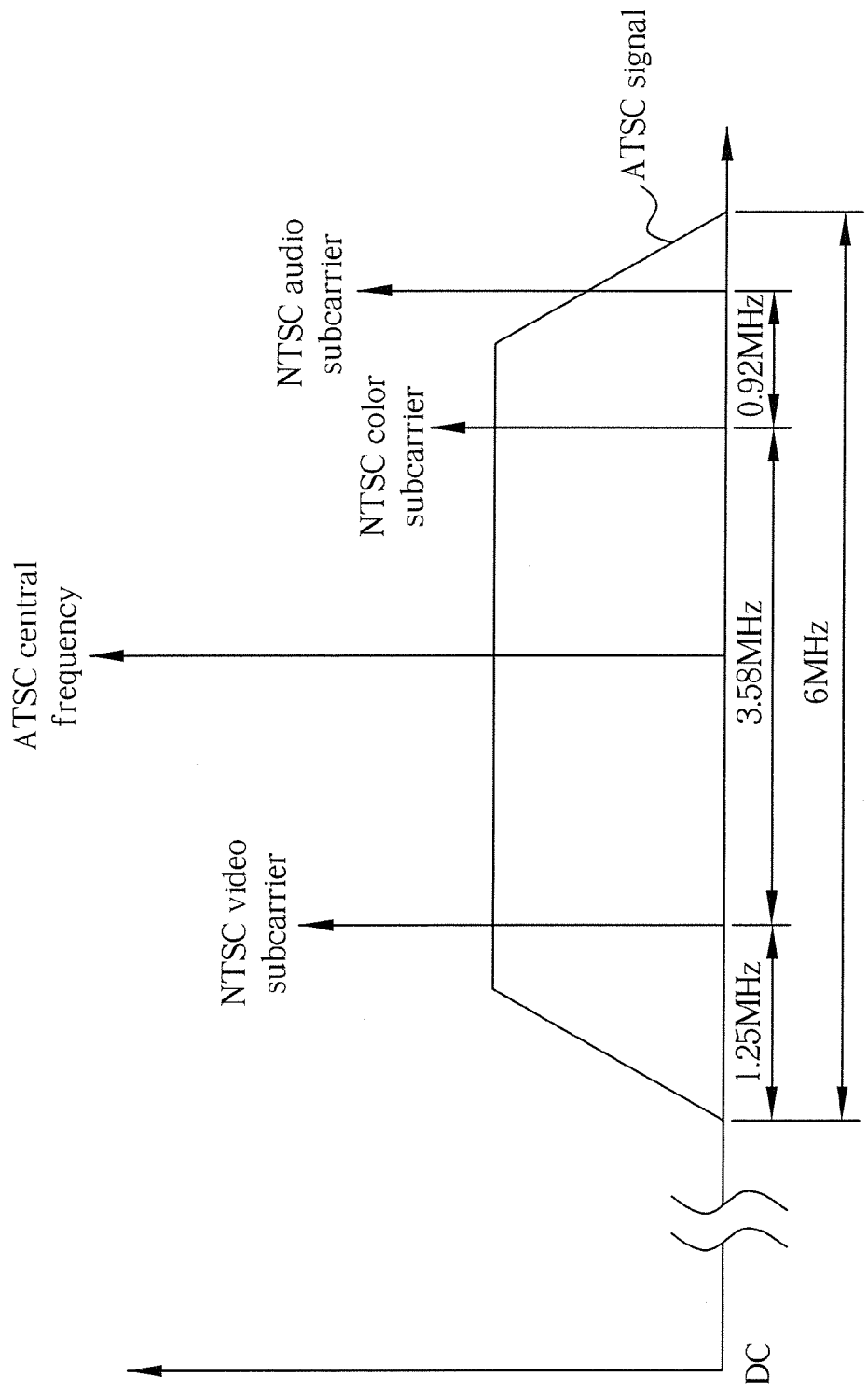
FIG. 1 is a diagram of typical transmission bands conforming to the advanced television systems committee (ATSC) DTV standard and the National Television System Committee (NTSC) analog TV standard.

In this embodiment, as shown in FIG. 2, the input baseband complex signal is passed through a filtering path composed of a frequency shifter 130, a notch filter 140, and a frequency shifter 150, in an attempt to notch out unwanted NTSC interferences. The notched-out version of the baseband complex signal and its as-originally-received counterpart are then multiplexed by a multiplexer 160 according to a control signal output by a lock detector 170. A NTSC carrier acquisition unit 120 also receives the baseband complex signal, for determining the location(s) of the NTSC interferences within the frequency spectrum. As shown in FIG. 1, according to well-defined standard, the distances among NTSC subcarrier tones, such as the NTSC video subcarrier, color subcarrier, and audio subcarrier, are fixed. Therefore, the acquisition unit 120 can determine the locations of all the NTSC interferences by merely tracking one of the subcarriers, such as, in this embodiment, the NTSC video subcarrier. The acquisition unit 120 then signals the amount of frequency shifting $e^{-j\Delta wt}$ of the frequency shifter 130, and subsequently the amount of frequency shifting $e^{j\Delta wt}$ of the frequency shifter 150 through a complex conjugate calculation unit 125, in order to resume the original frequency location after notching. The notch filter 140 may be implemented in a number of known ways, such that the notch filter 140 notches out the unwanted NTSC interferences in the frequency-shifted version of the baseband complex signal. Such a notch filter 140 may be a filter with a plurality of nulls, or composed of a plurality of single-null notch filters at various frequencies. One-by-one filtering by a single-null notch filter is also a feasible option, which is not detailed herein but should be apparent to one of ordinary skill in the art. Lastly, the lock detector 170 determines whether the NTSC carrier acquisition unit 120 locks to the specific interference tone (e.g., the NTSC video subcarrier), and when determined locked, the lock detector 170 signals the multiplexer 160 to output the notch-filtered baseband complex signal; otherwise the multiplexer 160 outputs the baseband complex signal as originally received.

Figure 3:
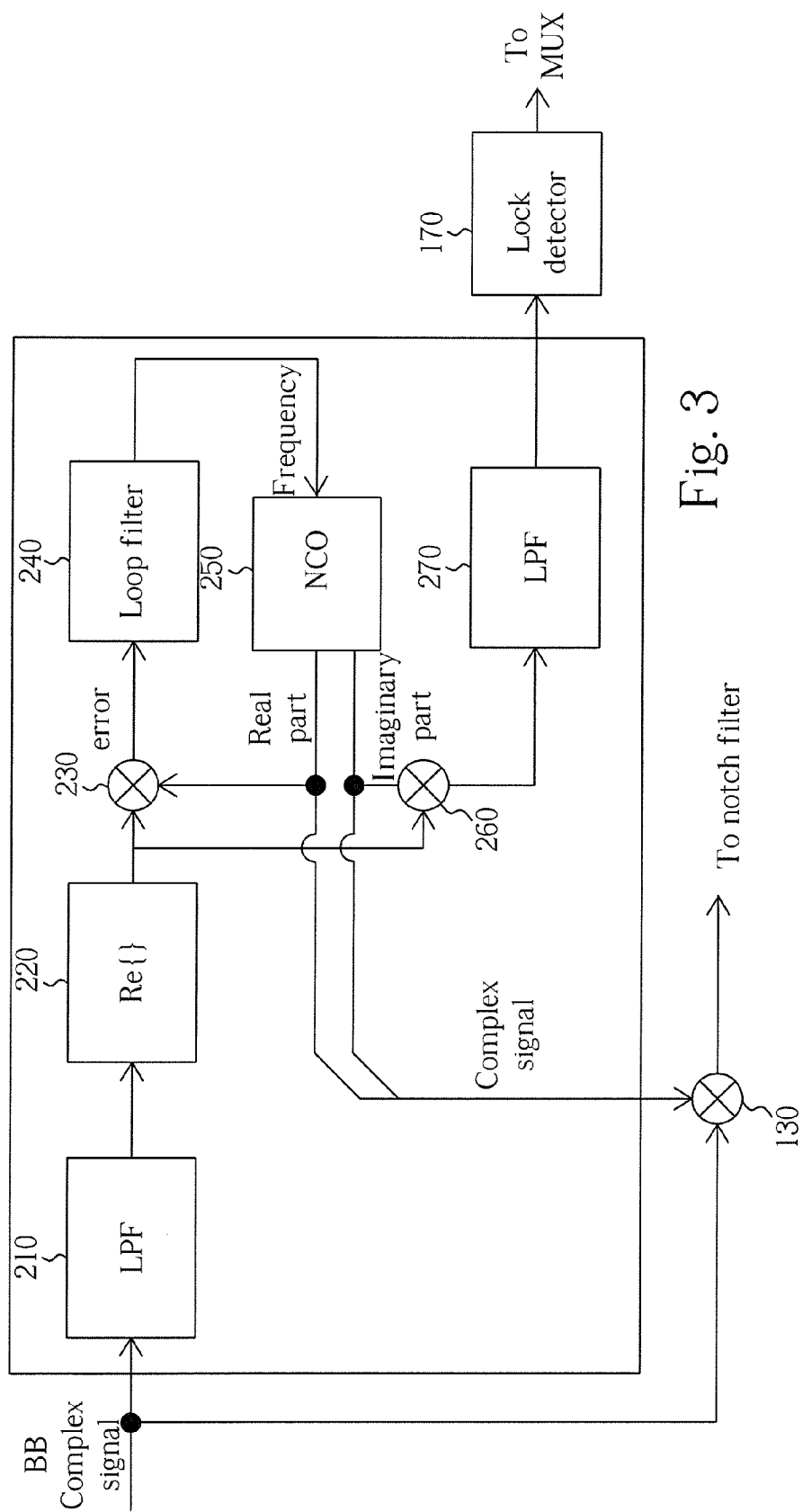
FIG. 3 is a block diagram of an NTSC carrier acquisition unit as shown in FIG. 2 according to an embodiment of the present invention.

Please refer to FIG. 3, which is a block diagram of an NTSC carrier acquisition unit 120 as shown in FIG. 2 according to an embodiment of the present invention. The acquisition unit 120, in this embodiment, comprises a low pass filter 210 and a real component extraction unit 220, which generate a low-pass filtered real component of the baseband complex signal as received. Such filtered real component is then fed to a phase locked loop composed of a phase detector 230, a loop filter 240, and a numerical controlled oscillator 250, which generates the complex signal $e^{-j\Delta wt}$ representing the frequency shifting of the shifter 130. The real part of the $e^{-j\Delta wt}$ is fed back to the phase detector 230, while the imaginary part of the $e^{-j\Delta wt}$ is fed to a mixer 260 for mixing with the output of the real component extraction unit 220, and generating, through another low-pass filter 270, the input of the lock detector 170. Under such configuration, the lock detector 170 signals the multiplexer 160 to switch to output the notch-filtered baseband complex signal and determines locked when the signal from the phase locked loop is detected stabilized. It is considered that a person of ordinary skill in the television art will be readily able to make and use the acquisition unit 120 and the lock detector 170 upon fully understanding the above disclosure and the accompanying drawings of the present invention, and further details are thus not illustrated herein.

Figure 4:
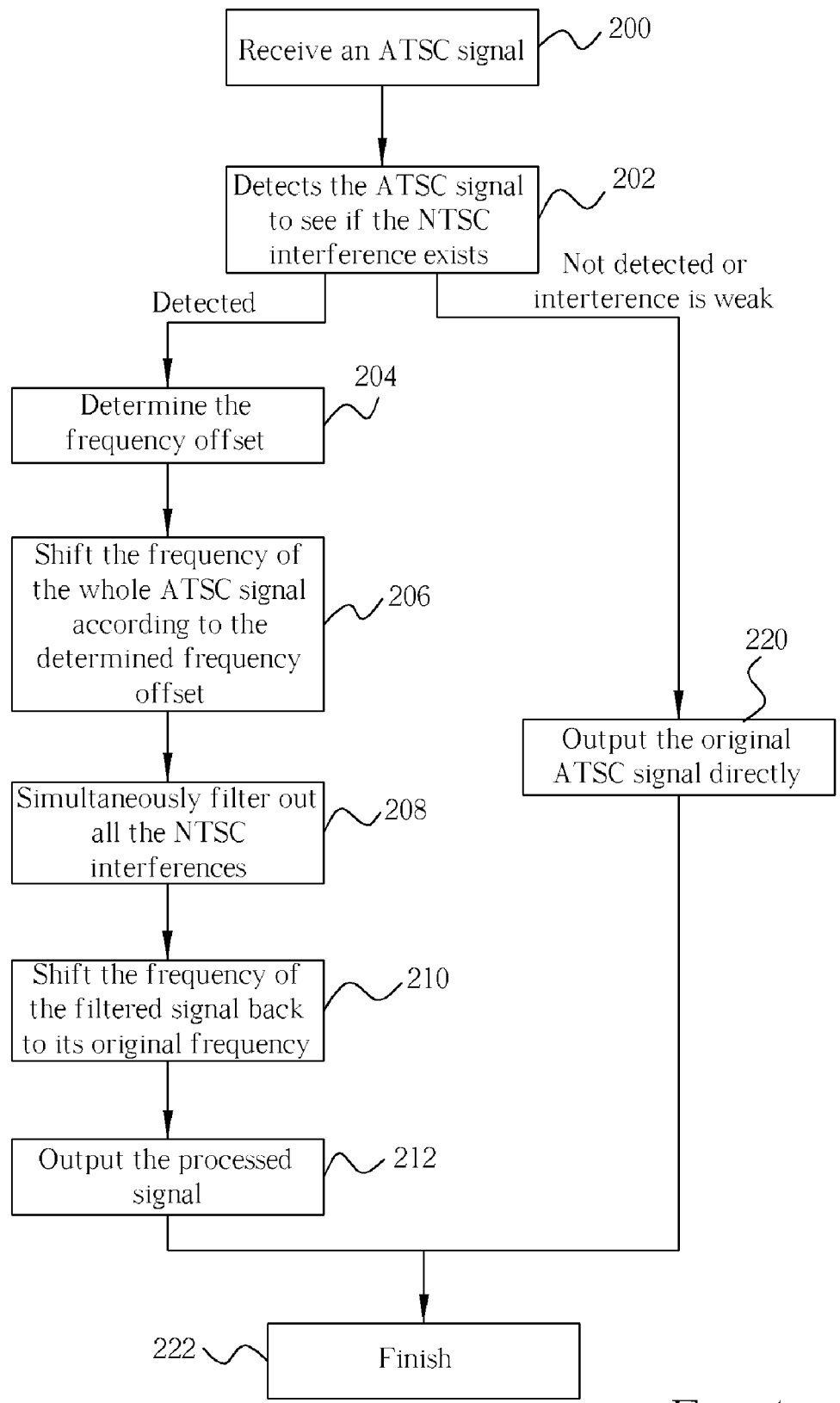
FIG. 4 is an embodiment flowchart of rejecting the NTSC interference performed by the apparatus shown in FIG. 2.

Please refer to FIG. 4, which is a flowchart illustrating the operation of the apparatus 100 shown in FIG. 2. The operation of rejecting the interference includes the following steps:

Step 200: Receive an ATSC signal;

Step 202: The acquisition unit 120 detects the ATSC signal to see if the NTSC interference exists. Here, if the NTSC interference is detected, go to step 204; otherwise, go to step 220;

Step 204: The acquisition unit 120 determines the frequency offset between the detected NTSC interference frequency and the standard-specified NTSC interference frequency;

Step 206: The frequency shifter 130 shifts the frequency of the whole ATSC signal spectrum according to the determined frequency offset;

Step 208: The notch filter 140 filters out all the NTSC interferences;

Step 210: The frequency shifter 150 shifts the frequency of the filtered signal back to its original frequency location;

Step 212: Output the processed signal, and then go to step 222;

Step 220: Output the original ATSC signal, directly; and

Step 222: Finish.

As mentioned above, the lock detector 120 signals to the multiplexer 160 according to the locking result. If the NTSC sub-carrier is not locked, this means that the NTSC interferences may be too weak or the NTSC interferences do not exist. In this situation, the original ATSC signal does not need to undergo the filtering process, and the multiplexer 160 delivers the unprocessed ATSC signal to the subsequent circuitry according to the signal outputted by the lock detector 120. Otherwise, if the NTSC interference sub-carrier is locked, this means that the ATSC signal needs to be processed through the above-mentioned steps for filtering out the unwanted NTSC interferences. It can be seen that the multiplexer 160 is controlled to pass the processed ATSC signal to the back-end processing module 170 according to the signal outputted by the lock detector 120.

The present invention apparatus and method can detect and reject NTSC co-channel interferences with the carrier offset among different transmitters, ensuring that the ATSC signal can be well processed later. Moreover, the present invention apparatus and method can reject the three NTSC co-channel interferences at the same time. Consequently, the present invention system and method does not need to sequentially shift the frequency of the ATSC signal three times in order to reject the NTSC interference, which improves the processing efficiency. In addition, the present invention apparatus and method provides a NTSC carrier acquisition unit and a lock detector to detect the NTSC interferences. This reduces the detection errors due to the frequency selective fading effect.

In other words, utilizing the acquisition unit and the lock detector makes the detection more efficient.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for rejecting an interference component from a frequency spectrum of an input signal, the method comprising:
   receiving the input signal;
   locking the interference component in the input signal, wherein the locking step further comprises:
      extracting a first part of the input signal to generate the first part of the input signal;
      detecting a difference between the first part of the input signal and a first part of a locked signal;
      generating the locked signal according to the difference between the first part of the input signal and the first part of the locked signal;
   detecting the locking status of the locking step;
   filtering out the interference component from the input signal; and
   selecting only one of the received input signal and a resultant signal of the filtering operation for output, based on the locking status, wherein the resultant signal is output when the locking status is detected, and the received input signal is output when the locking status is not detected.

2. The method of claim 1, further comprising: frequency-shifting the received input signal according to the locked signal.

3. The method of claim 1, wherein the filtering step is performed by a notch filter.

4. The method of claim 1, wherein the interference component corresponds to an NTSC signal, and the input signal corresponds to an ATSC signal.

5. The method of claim 1, wherein the first part of the input signal is a real part of the input signal, and the first part of the locked signal is a real part of the locked signal.

6. The method of claim 1, further comprising:
   mixing the first part of the input signal and a second part of the locked signal to generate a mixed signal;
   wherein the locking status is determined according to the mixed signal.

7. The method of claim 6, further comprising:
   selecting only one of the received input signal and a resultant signal of the filtering operation for output, based on the locking status.

8. A method for rejecting an interference component from a frequency spectrum of an input signal, the method comprising:
   receiving the input signal;
   extracting a first part of the input signal to generate the first part of the input signal;
   detecting a difference between the first part of the input signal and a first part of a locked signal;
   generating the locked signal according to the difference between the first part of the input signal and the first part of the locked signal;
   frequency-shifting the input signal by the locked signal;
   filtering the frequency-shifted input signal to filter out the interference component from the input signal; and
   selecting only one of the received input signal and a resultant signal of the filtering operation for output, based on a locking status of the interference component, wherein the resultant signal is output when the locking status is detected, and the received input signal is output when the locking status is not detected.

9. The method of claim 8, wherein the filtering step is performed by a notch filter.

10. The method of claim 8, further comprising: frequency-shifting the filtered input signal by a second frequency-shifting amount.

11. The method of claim 8, wherein the interference component corresponds to an NTSC signal, and the input signal corresponds to an ATSC signal.

12. The method of claim 8, wherein the first part of the input signal is a real part of the input signal, and the first part of the locked signal is a real part of the locked signal.

13. The method of claim 8, further comprising:
    mixing the first part of the input signal with a second part of the locked signal to generate a mixed signal; and
    detecting a locking status according to the mixed signal.

14. The method of claim 13, further comprising:
    selecting only one of the input signal and a resultant signal of the filtering operation for output, based on the locking status, wherein the resultant signal is output when the locking status is detected, and the received input signal is output when the locking status is not detected.

15. An apparatus for rejecting an interference component from a frequency spectrum of an input signal, the apparatus comprising:
    an interference locking unit for receiving the input signal and locking the interference component in the received input signal, wherein the interference locking unit comprises:
        an extraction unit for receiving the input signal and extracting a first part of the input signal to generate the first part of the input signal;
        a detecting unit, coupled to the extraction unit, for detecting a difference between the first part of the input signal and a first part of a locked signal; and
        a controlled oscillator, coupled to the detecting unit, for generating the locked signal according to the difference between the first part of the input signal and the first part of the locked signal;
    a lock detector coupled to the interference locking unit, for detecting a locking status of the interference locking unit;
    a filter for receiving the input signal and filtering out the interference component from the input signal; and
    a multiplexer receiving the input signal and coupled to the filter, the multiplexer configured to select only one of the received input signal and a resultant signal output by the filter, based on the locking status output by the lock detector, the multiplexer further configured to output the resultant signal when the locking status is detected, and to output the received input signal when the locking status is not detected.

16. The apparatus of claim 15, further comprising: a frequency filter for receiving the input signal and frequency-shifting the input signal.

17. The apparatus of claim 15, wherein the filter comprises at least a notch filter.

18. The apparatus of claim 15, wherein the interference component corresponds to an NTSC signal, and the input signal corresponds to an ATSC signal.

19. The apparatus of claim 15, wherein the first part of the input signal is a real part of the input signal, and the first part of the locked signal is a real part of the locked signal.

20. The apparatus of claim 15, further comprising:
a mixer for mixing the first part of the input signal and a second part of the locked signal to generate a mixed signal;
wherein the locking status is determined according to the mixed signal.

21. The method of claim 20, further comprising:
a multiplexer for selecting only one of the received input signal and a resultant signal of the filtering operation for output, based on the locking status.

22. An apparatus for rejecting an interference component from a frequency spectrum of an input signal, the apparatus comprising:
an interference acquisition unit for receiving the input signal, wherein the interference acquisition unit comprises:
an extraction unit for receiving the input signal and extracting a first part of the input signal to generate the first part of the input signal;
a detecting unit, coupled to the extraction unit, for detecting a difference between the first part of the input signal and a first part of a locked signal; and
a controlled oscillator, coupled to the detecting unit, for generating the locked signal according to the difference between the first part of the input signal and the first part of the locked signal;
a first frequency shifter for receiving the input signal and frequency-shifting the input signal according to the locked signal;
a filter coupled to the first frequency shifter, for filtering out the interference component from the frequency-shifted input signal; and
a multiplexer receiving the input signal and coupled to the filter, the multiplexer configured to select only one of the input signal and a resultant signal output by the filter, based on a locking status of the interference component, the multiplexer further configured to output the resultant signal when the locking status is detected, and to output the received input signal when the locking status is not detected.

23. The apparatus of claim 22, wherein the filter comprises at least a notch filter.

24. The apparatus of claim 22, further comprising: a second frequency shifter coupled to the filter, for frequency-shifting the filtered input signal by a second frequency-shifting amount.

25. The apparatus of claim 22, wherein the interference component corresponds to an NTSC signal, and the input signal corresponds to an ATSC signal.

26. The apparatus of claim 22, wherein the first part of the input signal is a real part of the input signal, and the first part of the locked signal is a real part of the locked signal.

27. The apparatus of claim 22, the interference acquisition unit further comprising:
a mixer, coupled to the controlled oscillator and the extraction unit, for mixing the first part of the input signal with a second part of the locked signal to generate a mixed signal.

28. The apparatus of claim 27, wherein the first part of the input signal is a real part of the input signal, the second part of the locked signal is an imaginary part of the locked signal.

29. The apparatus of claim 27, further comprising:
a lock detector, coupled to the mixer, for determining a locking status according to the mixed signal.

30. The apparatus of claim 29, further comprising:
a multiplexer receiving the input signal and coupled to the filter, the multiplexer configured to select only one of the input signal and a resultant signal output by the filter, based on the locking status output by the lock detector.

* * * * *